(12) United States Patent
Murata

(10) Patent No.: US 9,987,654 B2
(45) Date of Patent: Jun. 5, 2018

(54) IMPREGNATION DEVICE AND IMPREGNATION METHOD

(71) Applicant: Toshio Murata, Shiga (JP)

(72) Inventor: Toshio Murata, Shiga (JP)

(73) Assignee: Toshio Murata, Shiga (JP)

( * ) Notice: Subject to any disclaimer, the term of this patent is extended or adjusted under 35 U.S.C. 154(b) by 302 days.

(21) Appl. No.: 14/533,176

(22) Filed: Nov. 5, 2014

(65) Prior Publication Data

US 2015/0125608 A1 May 7, 2015

(30) Foreign Application Priority Data

Nov. 7, 2013 (JP) ................................. 2013-231401
Jun. 30, 2014 (JP) ................................. 2014-133836

(51) Int. Cl.
| | | |
|---|---|---|
| *B05C 11/10* | (2006.01) | |
| *B05C 3/02* | (2006.01) | |
| *B05D 1/18* | (2006.01) | |
| *B29B 15/12* | (2006.01) | |
| *D06B 3/12* | (2006.01) | |

(52) U.S. Cl.
CPC ............ *B05C 11/1002* (2013.01); *B05C 3/02* (2013.01); *B05D 1/18* (2013.01); *B29B 15/125* (2013.01); *D06B 3/12* (2013.01)

(58) Field of Classification Search
None
See application file for complete search history.

(56) References Cited

U.S. PATENT DOCUMENTS

| | | |
|---|---|---|
| 4,258,646 A | 3/1981 | Kloczewski et al. |
| 5,834,114 A | 11/1998 | Economy et al. |
| 2004/0258646 A1 | 12/2004 | Nielsen et al. |
| 2009/0176020 A1* | 7/2009 | Vaerewyck ............... B27K 3/08 427/294 |

FOREIGN PATENT DOCUMENTS

| | | | |
|---|---|---|---|
| CN | 202028509 U | 11/2011 | |
| DE | 4124226 | * 1/1993 | ............... B05D 1/18 |
| DE | 4124226 A1 | 1/1993 | |
| EP | 2730914 A1 | 5/2014 | |
| JP | 55-134667 | 10/1980 | |
| JP | 60-248253 | 7/1985 | |
| JP | 62-121636 | 6/1987 | |
| JP | 63-28168 A | 2/1988 | |

(Continued)

OTHER PUBLICATIONS

Office Action Dated Nov. 25, 2016 Issued in Corresponding German Patent Application No. 102014113757.4.

(Continued)

*Primary Examiner* — Jethro M Pence
(74) *Attorney, Agent, or Firm* — Harness, Dickey and Pierce, P.L.C.

(57) ABSTRACT

The present invention includes (i) a liquid storing tank in which an impregnating liquid is stored, (ii) a hollow tube provided in the liquid storing tank, (iii) a vacuum pump which produces a vacuum in one end of the hollow tube, and (iv) a transport mechanism which transports a porous material in the impregnating liquid drawn into the hollow tube. A degree of vacuum in the vacuum is maintained in a given range.

5 Claims, 4 Drawing Sheets

(56) References Cited

FOREIGN PATENT DOCUMENTS

| | | |
|---|---|---|
| JP | 63-182062 A | 7/1988 |
| JP | 08-072056 A | 3/1996 |
| JP | 2000-326310 A | 11/2000 |
| JP | 2001-029881 A | 2/2001 |
| JP | 2001-191014 A | 7/2001 |
| JP | 2001-259512 A | 9/2001 |
| JP | 2002-11400 | 1/2002 |
| JP | 2002-500549 A | 1/2002 |
| JP | 2004-123398 | 4/2004 |
| JP | 2004-306571 A | 11/2004 |
| JP | 46-40527 B1 | 12/2010 |
| JP | 2011-137405 A | 7/2011 |
| JP | 2011-162743 A | 8/2011 |
| JP | 2013-108058 A | 6/2013 |
| WO | WO-2009/157094 A1 | 12/2009 |
| WO | WO-2010/018642 A1 | 2/2010 |
| WO | WO-2011/081111 A1 | 7/2011 |

OTHER PUBLICATIONS

English Translation of an Office Action dated Apr. 29, 2016 issued in Co-pending Chinese Patent Application No. 201410577716.8.
Japanese Office Action dated May 5, 2017 issued in Japanese Patent Application No. 2014-133836.

\* cited by examiner

IMPREGNATION DEVICE AND IMPREGNATION METHOD

PRIORITY STATEMENT

This Nonprovisional application claims priority under 35 U.S.C. § 119 to Patent Application No. 2013-231401 filed in Japan on Nov. 7, 2013 and Patent Application No. 2014-133836 filed in Japan on Jun. 30, 2014, the entire contents of which are hereby incorporated by reference.

TECHNICAL FIELD

The present invention relates to (i) an impregnation device which impregnates pores of a porous material with an impregnating liquid and (ii) a method of impregnating pores of a porous material with an impregnating liquid.

BACKGROUND ART

Conventionally, a technique of impregnating pores of a porous material with an impregnating liquid, such as a liquid or a liquid (suspension) in which solid particles are suspended, has been widely industrialized. For example, prepreg, which is used for a printed-wiring board and the like, is produced in such a way that (i) bubbles in a fiber substrate is removed, (ii) the fiber substrate is impregnated with liquid resin, and (iii) the fiber substrate thus impregnated is thermally dried so that the liquid resin is half-cured.

As an example of such a method, Patent Literature 1 discloses a resin impregnation method in which a fiber substrate is impregnated with liquid resin by (i) sandwiching the liquid resin between the fiber substrate and a non-permeable sheet, which is wound around a roll and which the liquid resin does not permeate, and (ii) pressuring the liquid resin from a non-permeable sheet side. However, according to the resin impregnation method, bubbles remain in prepreg because the fiber substrate is pressure-impregnated with the liquid resin. Therefore, there has been a problem that it is not possible to sufficiently impregnate (fill) a fiber substrate with a liquid or a suspension.

Therefore, it is more effective to use a vacuum impregnation method than a pressure impregnation method in order to sufficiently remove bubbles (air bubbles) in pores of a porous material and to sufficiently impregnate the pores with an impregnating liquid. Techniques using this vacuum impregnation are disclosed in, for example, Patent Literatures 2 and 3.

For example, Patent Literature 2 discloses a negative pressure acting device which carries out a negative pressure acting process with respect to individually separated objects (porous materials) in such a way that (i) an acting liquid stored in a liquid storing tank is raised into a negative pressure producing tube, (ii) a negative pressure space is produced in an upper part of the negative pressure producing tube by means of a balance between the acting liquid in the negative pressure producing tube and an atmospheric pressure on the acting liquid in the liquid storing tank, and (iii) the objects are reciprocated up and down between a lower end opening of the negative pressure producing tube and the negative pressure space. According to the technique disclosed in Patent Literature 2, a lower on-off valve which opens and closes the lower end opening is provided near the acting liquid in the liquid storing tank so as to produce the negative pressure space.

Further, Patent Literature 3 discloses a method of impregnating a film-shaped material (sheet-shaped material) with an impregnating liquid in which method (i) the film-shaped material is vacuum-deaerated in a state where the film-shaped material is hold in a vacuum tank and (ii) the film-shaped material is moved in the impregnating liquid with the use of a pair of seal rollers so as to be impregnated with the impregnating liquid.

Further, as a conventional vacuum impregnation process, there is known a batch process. According to the batch process, for example, rolls obtained by individually rolling up porous materials are put in an airproof pressure-resistant container, and then the airproof pressure-resistant container is deaerated by suctioning air in the airproof pressure-resistant container with the use of a vacuum pump or the like so that the airproof pressure-resistant container has a negative pressure in it. Thereafter, an impregnating liquid is introduced into the airproof pressure-resistant container, and then the negative pressure in the airproof pressure-resistant container is returned to an atmospheric pressure. It is thus possible to impregnate pores of each of the porous materials with the impregnating liquid with the use of a differential pressure, serving as a driving force, between an internal pressure (negative pressure) of the pores of each of the porous materials and the atmospheric pressure. Note that, in the batch process, the impregnating liquid can be put in the airproof pressure-resistant container in advance before carrying out the deaeration by suction.

Note that Patent Literature 4 discloses a deaerator which vacuum-deaerates a liquid-like body by producing a vacuum in accordance with the Torricelli vacuum experiment (principle of Torricelli's vacuum). More specifically, the liquid-like body is vacuum-deaerated by (i) closing a valve so that a depressurizing pipe, an injection pipe, and an exhaust pipe are filled with the liquid-like body and then (ii) opening the valve so that the liquid-like body flows into the vacuum produced in an upper part of the depressurizing pipe.

CITATION LIST

Patent Literatures

Patent Literature 1
Japanese Patent Application Publication, Tokukaihei, No. 8-72056 A (Publication Date: Mar. 19, 1996)
Patent Literature 2
WO 2011/081111 (Publication Date: Jul. 7, 2011)
Patent Literature 3
Japanese Patent Application Publication, Tokukai, No. 2001-29881 A (Publication Date: Feb. 6, 2001)
Patent Literature 4
WO 2010/018642 (Publication Date: Feb. 18, 2010)

SUMMARY OF INVENTION

Technical Problem

However, according to the batch process, there has been a problem that a vacuum deaeration process can be only intermittently carried out with respect to a porous material. Therefore, in a case of the batch process, there has been a problem that productivity of prepreg and the like is low.

Furthermore, according to the technique disclosed in Patent Literature 2, in a case where the negative pressure acting process is carried out in the negative pressure producing tube while the objects are being continuously conveyed by a continuous conveying mechanism, the degree of vacuum of the negative pressure space decreases because air, gas, and the like discharged from the objects enter the negative pressure space. As a result, the negative pressure acting process decreases in efficiency and certainty. Therefore, according to the technique, it is necessary to again produce a negative pressure space by carrying out the following process: (i) the continuous conveying mechanism is stopped, (ii) the lower on-off valve (the lower end opening) is closed and then an exhaust valve is opened, (iii) the negative pressure producing tube is filled with the acting liquid, and (iv) the exhaust valve is closed and then the lower on-off valve is opened.

That is, the technique disclosed in Patent Literature 2 is configured such that, in a case where the degree of vacuum of the negative pressure space decreases during the vacuum impregnation, it is necessary to carry out the above process in order to return the degree of vacuum to a given degree. Therefore, in principle, it is inevitable to stop the continuous conveying mechanism in order to maintain the degree of vacuum. For this reason, the technique has had a problem that it is not possible to continuously carry out the vacuum impregnation and, accordingly, productivity of a product which requires the vacuum impregnation is low.

Further, according to the technique of Patent Literature 3, it is essential to sandwich the film-shaped material between the pair of seal rollers in order to maintain the degree of vacuum of the vacuum tank. Therefore, it is necessary to provide a complicated mechanism in order to maintain the degree of vacuum of (i) spaces between the pair of seal rollers which spaces exist on respective both sides of the film-shaped material sandwiched between the pair of seal rollers or (ii) sides of the pair of seal rollers which sides are opposite to sides on which the pair of seal rollers sandwiches the film-shaped material therebetween. Furthermore, in a case where the vacuum-impregnation is carried out in the vacuum tank, it may not be possible to secure a necessary amount of the impregnation liquid because the impregnating liquid with which the film-shaped material that has been vacuum-deaerated is impregnated is squeezed out due to a pressure of the pair of seal rollers.

Moreover, the technique disclosed in Patent Literature 4 is not a technique of deaerating pores of a porous material but deaerating a liquid-like body itself. Needless to say, the technique disclosed in Patent Literature 4 is not a technique of impregnating the pores of the porous material with an impregnating liquid.

The present invention has been made in view of the above problems, and an object of the present invention is to provide an impregnation device capable of, despite having a simple configuration, continuously vacuum-impregnating pores of a porous material with an impregnating liquid.

Furthermore, the present invention has been made in view of the above problems, and an object of the present invention is to provide a method of, despite being a simple method, continuously vacuum-impregnating pores of a porous material with an impregnating liquid.

Solution to Problem

In order to attain the above object, an impregnation device in accordance with an embodiment of the present invention includes: an impregnating liquid tank for storing an impregnating liquid with which a porous material is to be impregnated;

a hollow tube, having an opening at its one end, which is provided in the impregnating liquid tank so that the opening is soaked in the impregnating liquid;

a depressurizing device for depressurizing inside of the hollow tube so that (i) the impregnating liquid is drawn into the other end side of the hollow tube and (ii) a vacuum, whose degree of vacuum falls within a given range, is produced on the other end side of the hollow tube, the depressurizing device being communicated with the hollow tube; and a moving mechanism for moving the porous material in the impregnating liquid drawn into the hollow tube.

Further, in order to attain the above object, an impregnation method in accordance with an embodiment of the present invention is a method of impregnating a porous material with an impregnating liquid, including the steps of:

(a) adjusting a relative position of (i) a surface of an impregnating liquid stored in an impregnating liquid tank and (ii) an opening at one end of a hollow container so that the opening of the hollow container is soaked in the impregnating liquid in the impregnating liquid tank;

(b) depressurizing inside of the hollow container after the step (a) so that (i) the impregnating liquid is drawn into the other end side of the hollow container and (ii) a vacuum, whose degree of vacuum falls within a given range, is produced on the other end side of the hollow container; and (c) moving a porous material in the impregnating liquid drawn into the hollow container in the step (b).

Advantageous Effects of Invention

According to the present invention, it is possible to continuously carry out, with a simple configuration, vacuum impregnation with respect to a porous material.

Figure 2:
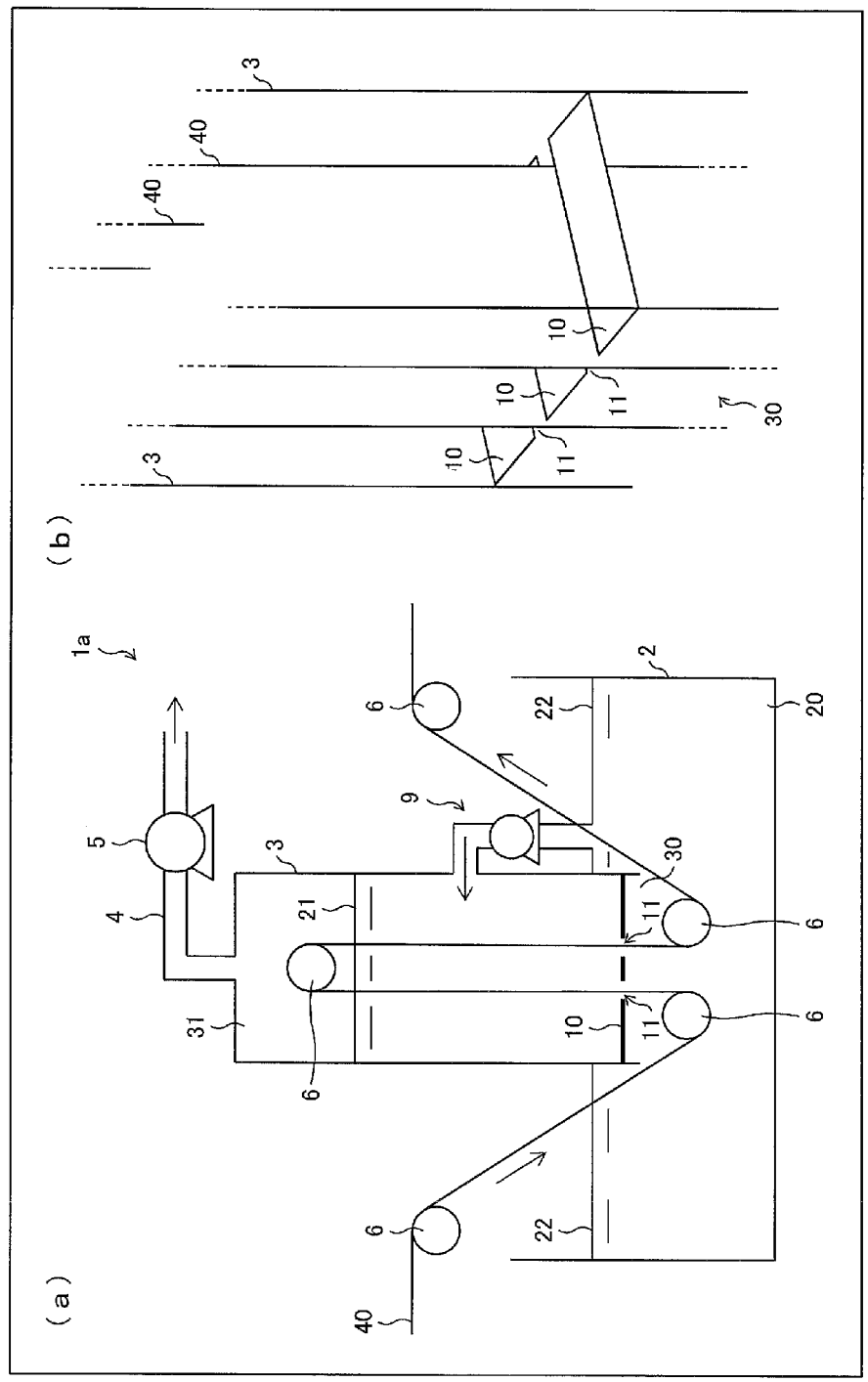

(a) of FIG. 2 is a cross-sectional view illustrating a configuration of a vacuum impregnation device in accordance with another embodiment of the present invention. (b) of FIG. 2 is a perspective view illustrating inside of a hollow tube in accordance with the another embodiment of the present invention.

Figure 3:
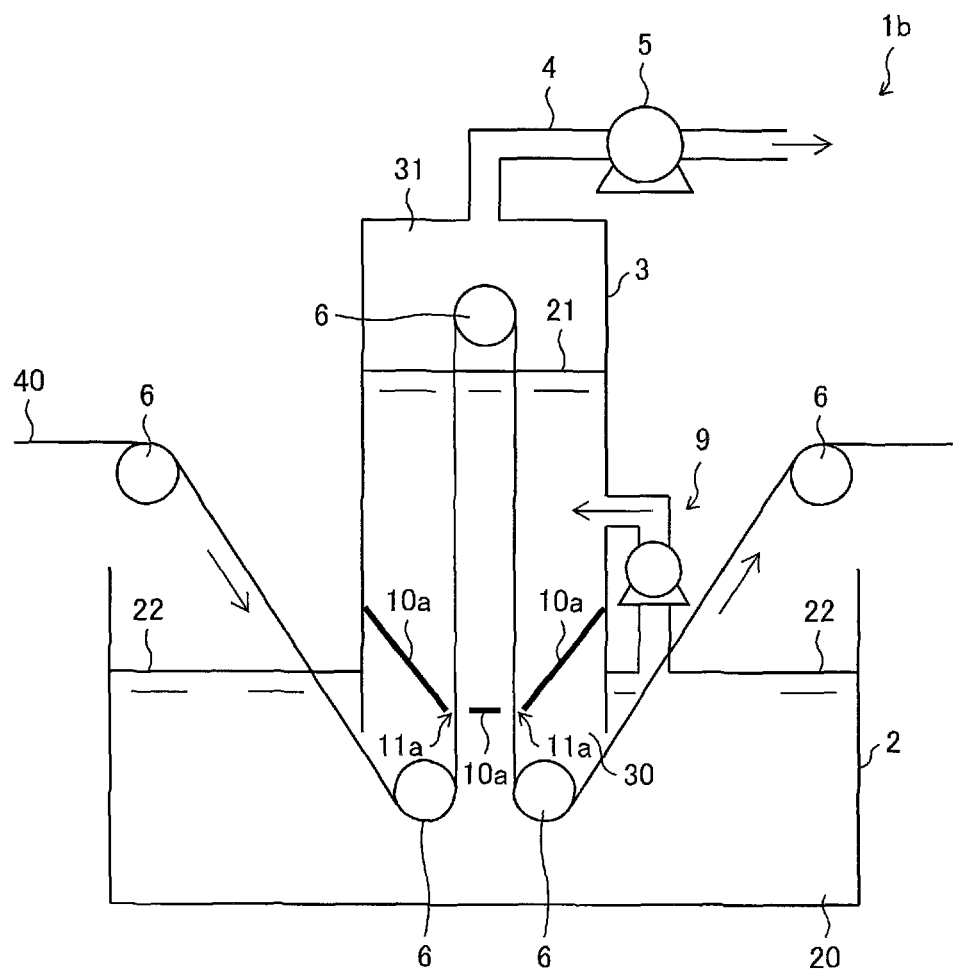

FIG. 3 is a cross-sectional view illustrating a configuration of a vacuum impregnation device which is a modification of the vacuum impregnation device illustrated in FIG. 2.

Figure 4:
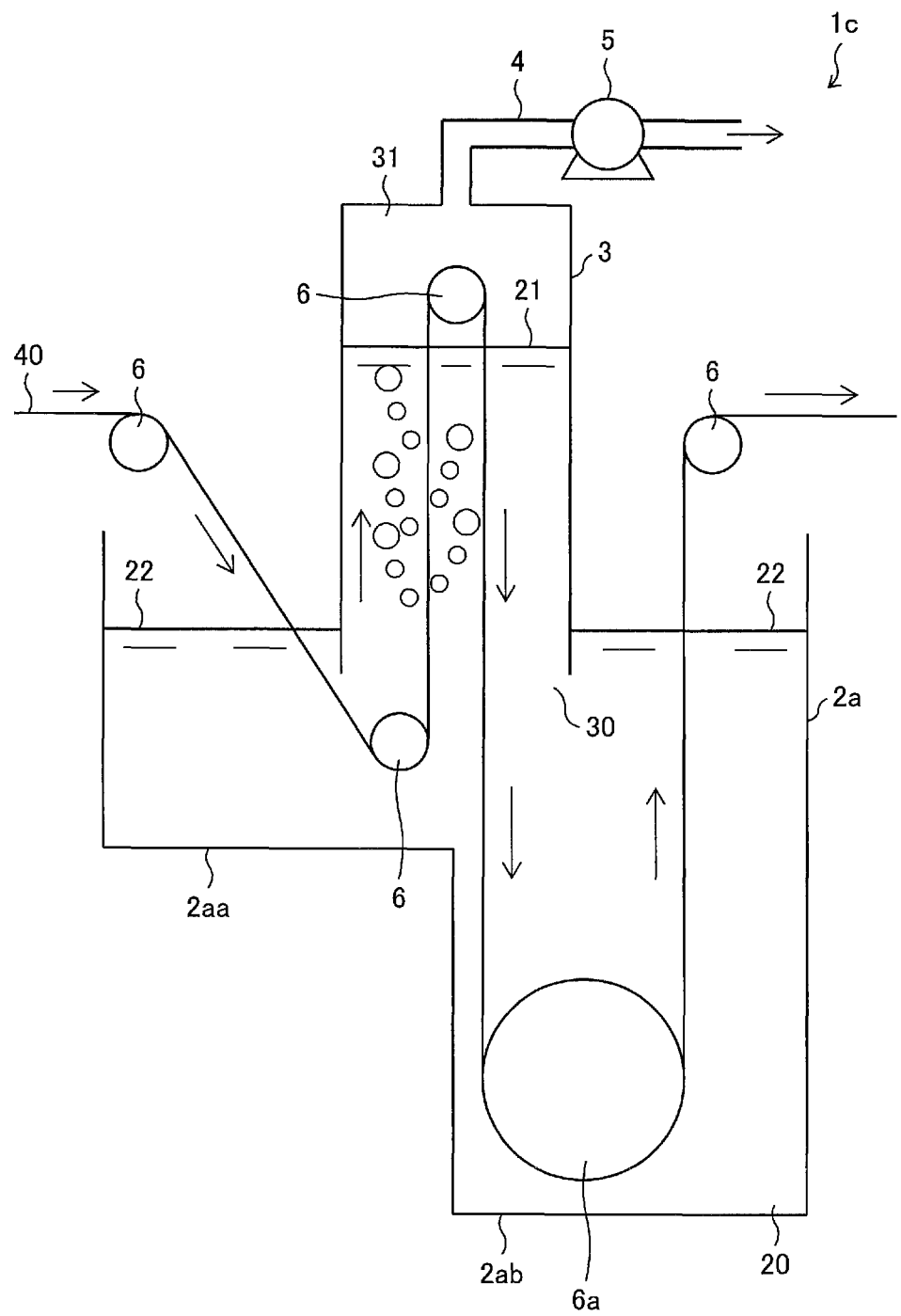

FIG. 4 is a cross-sectional view illustrating a configuration of a vacuum impregnation device in accordance with further another embodiment of the present invention.

DESCRIPTION OF EMBODIMENTS

Embodiment 1

(Configuration of Vacuum Impregnation Device)

Figure 1:
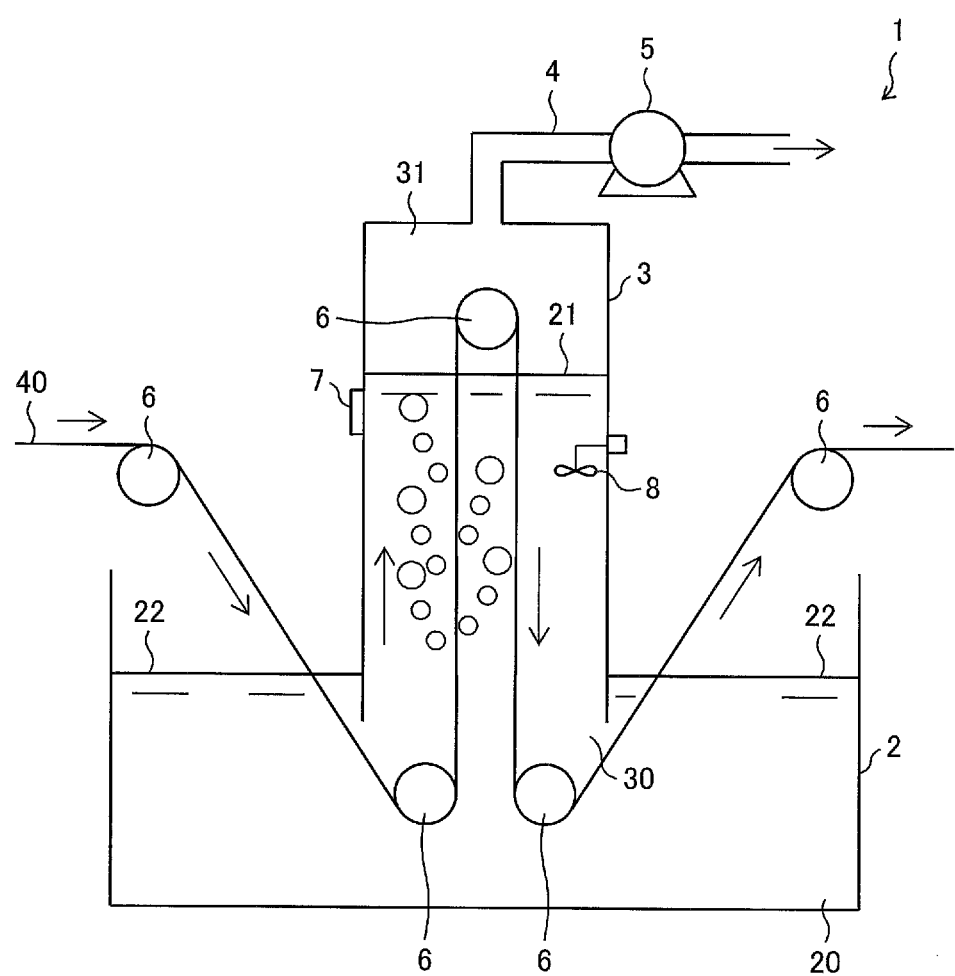
FIG. 1 is a cross-sectional view illustrating a configuration of a vacuum impregnation device in accordance with an embodiment of the present invention.

The following description will discuss Embodiment 1 of the present invention with reference to FIG. 1. FIG. 1 is a cross-sectional view illustrating a configuration of a vacuum impregnation device 1 in accordance with Embodiment 1 of the present invention. As illustrated in FIG. 1, the vacuum impregnation device 1 (impregnation device) includes a liquid storing tank 2 (impregnating liquid tank), a hollow tube 3, an exhaust tube 4, a vacuum pump 5 (depressurizing device), and a transport mechanism 6 (moving mechanism).

The liquid storing tank 2 is a container which has an open upper end in a vertical direction in a state where the vacuum impregnation device 1 is placed on a horizontal surface and which stores an impregnating liquid 20. A porous material 40 is impregnated with the impregnating liquid 20. The reason, why the upper end in the vertical direction of the liquid storing tank 2 is open, is that (i) an atmospheric pressure is applied to a surface of the impregnating liquid 20 stored in the liquid storing tank 2 and (ii) the porous material 40 is soaked in the impregnating liquid 20. It is not always necessary that the upper end in the vertical direction of the liquid storing tank 2 be open, provided that the above (i) and (ii) are achieved.

The porous material 40 has a plurality of pores which are invisible to a human eye. Examples of the porous material 40 include (i) fiber substrates, made of woven or non-woven fabric, for prepreg which is a laminated sheet material of fiber reinforced plastic (FRP) and (ii) porous materials made of a fiber substrate (material to be flame-retarded) in a form of wood, woven fabric, non-woven fabric, felt, or paper. The impregnating liquid 20 is a liquid or a liquid (suspension) in which solid particles are suspended. Examples of the impregnating liquid 20 include (i) a melted resin and (ii) a fire-retardant composition in a liquid state, such as an aqueous solution, an aqueous suspension, and a colloidal solution. Note that a fiber substrate, which is vacuum-impregnated with the melted resin, is used, for example, as a fiber material for contaminant absorption.

Note that Embodiment 1 will be described on the premise that the porous material 40, which is to be impregnated with the impregnating liquid 20 by the vacuum impregnation device 1, is a continuous long porous material. However, the porous material 40 is not limited to this, provided that the porous material 40 is configured so as to be impregnated with the impregnating liquid 20. For example, the porous material 40 can be alternatively a plurality of porous materials which are individually separated.

The hollow tube 3 is a tube in which a vacuum 31 is produced. The hollow tube 3 has an opening 30 at its one end. The opening 30 is soaked in the impregnating liquid 20. That is, the hollow tube 3 is provided in the liquid storing tank 2 so that the opening 30 is soaked in the impregnating liquid 20. The other end of the hollow tube 3 is communicated with the exhaust tube 4.

The exhaust tube 4 is a tube which is thinner than the hollow tube 3, and includes the vacuum pump 5. The vacuum pump 5 discharges gas, which is in the hollow tube 3, to outside of the vacuum impregnation device 1 through the exhaust tube 4. That is, in a case where the vacuum pump 5 operates, the gas in the hollow tube 3 is discharged through the exhaust tube 4. This causes the vacuum 31 to be produced in an upper part (on the other end side) of the hollow tube 3. The vacuum 31 is only necessary to be a space whose pressure is lower than the atmospheric pressure. How to produce the vacuum will be later described.

Note that, according to Embodiment 1, the vacuum pump 5 is provided in the middle of the exhaust tube 4 communicated with the other end of the hollow tube 3. However, the vacuum pump 5 is only necessary to be communicated with the hollow tube 3 so as to produce the vacuum 31 on the other end side of the hollow tube 3. For example, the vacuum pump 5 can be directly connected to the hollow tube 3.

The transport mechanism 6 transports the porous material 40 (i) from the outside of the vacuum impregnation device 1 to the liquid storing tank 2, (ii) from the liquid storing tank 2 to the other end side of the hollow tube 3, (iii) from the other end side of the hollow tube 3 to again the liquid storing tank 2, and (iv) from the liquid storing tank 2 to the outside of the vacuum impregnation device 1. The transport mechanism 6 is made up of a plurality of rollers (pulleys) which are provided, for example, above the liquid storing tank 2, in the liquid storing tank 2, and on the other end side of the hollow tube 3 (see FIG. 1). This causes the porous material 40 to be (i) carried in the impregnating liquid 20, (ii) carried in the impregnating liquid 20 again via the vacuum 31, and then (iii) carried outside the impregnating liquid 20.

The vacuum impregnation device 1 of Embodiment 1 is arranged such that the porous material 40 goes through the vacuum 31. However, the vacuum impregnation device 1 is not limited to such an arrangement, provided that the porous material 40 is vacuum-impregnated with the impregnating liquid 20 after the porous material 40 is vacuum-deaerated. For example, a roller provided in the hollow tube 3 can be alternatively provided closer to the opening 30.

That is, it is only necessary that the transport mechanism 6 move the porous material 40 at least in the impregnating liquid 20 drawn into the hollow tube 3. More specifically, it is only necessary that the transport mechanism 6 (i) move the porous material 40 from vicinity of the opening 30 to vicinity of a surface 21 of the impregnating liquid 20 drawn into the hollow tube 3 and (ii) then move the porous material 40 from the vicinity of the surface 21 to the vicinity of the opening 30. According to FIG. 1, the transport mechanism 6 then moves the porous material 40 into the liquid storing tank 2 via the opening 30. Note, however, that, in order that vacuum deaeration and vacuum impregnation are sufficiently carried out, the roller is preferably provided in the hollow tube 3 so that the porous material 40 goes through the vacuum 31 (or near the vacuum 31).

Note that Embodiment 1 is described on the premise that the transport mechanism 6 is made up of the plurality of rollers. However, in a case where the porous material 40 is made up of a plurality of porous materials, the transport mechanism 6 can alternatively include a plurality of rollers, an endless conveyor wound around the plurality of rollers, and holding sections which (i) are provided on the endless conveyor so that adjacent ones are away from each other and (ii) hold the respective plurality of porous materials.

Note that FIG. 1 illustrates a heating mechanism 7 and a stirring mechanism 8. However, it is optional for the vacuum impregnation device 1 to include the heating mechanism 7 and the stirring mechanism 8. That is, it is only necessary that the vacuum impregnation device 1 of Embodiment 1 include the liquid storing tank 2, the hollow tube 3, the vacuum pump 5, and the transport mechanism 6. The heating mechanism 7 and the stirring mechanism 8 will be later described in detail.

(Production of Vacuum)

Next, how to produce the vacuum 31 will be described in detail below. The vacuum impregnation device 1 of Embodiment 1 produces a vacuum not by use of the principle of Torricelli's vacuum, but by operating the vacuum pump.

In the vacuum impregnation device 1, gas in the hollow tube 3 is discharged through the exhaust tube 4 by (i) providing the hollow tube 3 so that the opening 30 is soaked in the impregnating liquid 20 stored in the liquid storing tank 2 and (ii) operating the vacuum pump 5. In this case, in response to a reduction in atmospheric pressure in the hollow tube 3, the surface 21 of the impregnating liquid 20 in the hollow tube 3 rises toward the other end side from the vicinity of the opening 30. In response to the rising of the surface 21, a surface 22 of the impregnating liquid 20 outside the hollow tube 3 (that is, in the liquid storing tank 2) lowers.

In a case where the atmospheric pressure in the hollow tube 3 balances with (i) a pressure due to a weight of the impregnating liquid 20 in the hollow tube 3 and (ii) an atmospheric pressure acting on the surface 22 of the impregnating liquid 20, the rising of the surface 21 and the lowering of the surface 22 are stopped. Since an inner diameter of the hollow tube 3 is smaller than that of the liquid storing tank 2, the surface 21 rises above the surface 22, and the vacuum 31, whose degree of vacuum falls within a given range, is produced on the other end side of the hollow tube 3, after operation of the vacuum pump 5 (see FIG. 1). The given range of the degree of vacuum will be later described.

Note that it is assumed that an amount of the impregnating liquid 20 in the liquid storing tank 2 is enough for the opening 30 to be soaked in the in the impregnating liquid 20 even in a case where the surface 22 lowers. Note also that the operation of the vacuum pump 5 can be stopped after the vacuum 31 is produced. That is, it is not necessary to always operate the vacuum pump 5, as long as the degree of vacuum falls within the given range.

(Vacuum impregnation method)

Next, the following description will discuss, in detail, a method of vacuum-impregnating the porous material 40 with the impregnating liquid 20 with the use of the vacuum impregnation device 1. It is assumed that, as illustrated in FIG. 1, (i) the vacuum 31 is produced in the vacuum impregnation device 1 and (ii) the porous material 40 is in a state where the porous material 40 can be transported by the transport mechanism 6. As has been described, the porous material 40 is carried in the impregnating liquid 20, then again carried in the impregnating liquid 20 via the vacuum 31, and carried outside the impregnating liquid 20, by the transport mechanism 6.

By the transport mechanism 6, the porous material 40 is carried in the impregnating liquid 20 stored in the liquid storing tank 2, and is then transported from the liquid storing tank 2 to the vacuum 31 produced in the hollow tube 3 via the opening 30 of the hollow tube 3. While the porous material 40 is being transported to the vacuum 31, a pressure, expressed by an expression Pa-gρh, is applied to gas (for example, air) in the plurality of pores of the porous material 40 by the impregnating liquid 20 at a height h from the surface 22 of the impregnating liquid 20 in the liquid storing tank 2, where Pa denotes an atmospheric pressure, ρ denotes a density of an impregnating liquid, and g denotes gravitational acceleration. Here, a pressure of the gas in the plurality of pores is Pa in the atmospheric air. Therefore, a differential pressure ghρ between the pressure applied to the gas by the impregnating liquid 20 and the pressure of the gas acts as a driving force, so that the gas is discharged into the impregnating liquid 20 from the plurality of pores. In a case where the porous material 40 arrives in the vacuum 31, almost all the gas remaining in the plurality of pores is discharged. This causes each of the plurality of pores to be in a vacuum. The porous material 40 is then transported, by the transport mechanism 6, to the opening 30 of the hollow tube 3 via the impregnating liquid 20 drawn into the hollow tube 3. During this process, the impregnating liquid 20 enters the plurality of pores in a vacuum, and each of the plurality of pores is thus filled with the impregnating liquid 20 (that is, each of the plurality of pores is vacuum-impregnated with the impregnating liquid 20). The porous material 40 impregnated with the impregnating liquid 20 is carried, by the transport mechanism 6, outside the impregnating liquid 20 stored in the liquid storing tank 2.

(Effect of Vacuum Impregnation Device 1)

According to Embodiment 1, the vacuum pump 5 depressurizes inside of the hollow tube 3, so that the impregnating liquid 20 is drawn into the other end side from the opening 30 of the hollow tube 3. This causes the vacuum 31 to be produced on the other end side of the hollow tube 3. The transport mechanism 6 then transports the porous material 40 as described above. Therefore, the vacuum impregnation device 1 is capable of (i) vacuum-deaerating the plurality of pores of the porous material 40 and (ii) vacuum-impregnating the plurality of pores with the impregnating liquid 20.

In a case where the vacuum impregnation is continued with respect to the porous material 40, the gas, discharged from the plurality of pores of the porous material 40 by the vacuum-deaeration, enters the vacuum 31. This causes an increase in atmospheric pressure of the vacuum 31, and ultimately causes a decrease in degree of vacuum of the vacuum 31. According to Embodiment 1, the vacuum 31 is produced by the vacuum pump 5, and the degree of vacuum of the vacuum 31 is maintained in the given range. For example, a pressure sensor (not illustrated), which detects a pressure (degree of vacuum) of the vacuum 31, is provided on the other end side of the hollow tube 3. Data indicative of a value of the pressure detected by the pressure sensor is transmitted to a determination device (not illustrated), which determines whether or not the value of the pressure is higher than a given value set in the given range. In a case where the determination device determines that the value of the pressure detected by the pressure sensor is higher than the given value, the vacuum pump 5 is caused to operate until a value of a pressure of the vacuum 31 is at least equal to or lower than the given value. This causes the degree of vacuum of the vacuum 31 to be maintained in the given range. It is therefore possible to suppress a decrease in degree of vacuum.

Note that the given range is not limited to a specific one, provided that the given range allows the vacuum deaeration and the vacuum impregnation to be sufficiently carried out with respect to the porous material 40. Further, the given value is not limited to a specific one, provided that the given value is one (i) that is in the given range and is close to an upper limit of the given range and (ii) that is set so that the degree of vacuum of the vacuum 31 falls within the given range even in a case where the vacuum pump 5 is caused to operate in accordance with determination made by the determination device. Note also that the given range is only necessary to be not less than 0 (zero) Pa and not more than $10^5$ Pa, in a case where the vacuum pump 5 operates, for example, under an atmospheric pressure at a height of 0 m (zero meter) above sea level. Further, the given value is only necessary to be set to, for example, not less than $2.0 \times 10^3$ Pa and not more than $2.2 \times 10^3$ Pa because a saturated vapor pressure is $2.3 \times 10^3$ Pa in a case where the impregnating liquid 20 is, for example, water of 20° C.

The vacuum 31 is produced by the vacuum pump 5. As such, it is not necessary to provide, in the hollow tube 3, (i) a first on-off valve which controls communication between the inside of the hollow tube 3 and outside air and (ii) a second on-off valve which controls communication between the inside of the hollow tube 3 and the liquid storing tank 2, the first on-off valve and the second on-off valve being necessary in a case where a vacuum is produced in a hollow tube by use of the principle of Torricelli's vacuum. That is, according to Embodiment 1, the vacuum 31 is produced by the vacuum pump 5, instead of using the principle of Torricelli's vacuum. It is therefore not necessary to provide (i) an exhaust valve (first on-off valve) in the exhaust tube 4 and (ii) a lower on-off valve (second on-off valve) in the opening 30, unlike the technique disclosed in Cited Document 2.

It follows that the vacuum impregnation device 1 does not need to control the stopping of the vacuum impregnation, unlike Cited Document 2, for the purposes of (i) producing a vacuum 31 and (ii) maintaining a degree of vacuum of the vacuum 31. This makes it possible to continuously vacuum-impregnate a porous material 40.

Furthermore, the vacuum impregnation device 1 does not need to provide a complicated mechanism which is necessary in a case where a pair of seal rollers is provided. It is therefore possible to vacuum-impregnate, with a simple configuration, a porous material 40 with an impregnating liquid 20.

(Modified Example of Vacuum Impregnation Device 1)

In a case where (i) the vacuum impregnation is continuously carried out with respect to the porous material 40 with the use of the vacuum impregnation device 1 and (ii) a vapor pressure, at a temperature during impregnation, of an impregnating liquid itself, a solvent, or a dispersion medium of the impregnating liquid 20 is high, to some extent, in the vicinity of the surface 21 in the hollow tube 3, the impregnating liquid itself, the solvent, or the dispersion medium escapes as vapor. It follows that vaporization latent heat is taken from the impregnating liquid 20. This causes a decrease in temperature of the impregnating liquid 20 and accordingly causes an increase in viscosity of the impregnating liquid 20. Consequently, a speed of impregnation decreases and, therefore, it becomes sometimes impossible to continue proper vacuum impregnation.

In view of the circumstances, the vacuum impregnation device 1 can further include a heating mechanism 7 which heats the impregnating liquid 20 near the surface 21 in the hollow tube 3. In this case, for example, (i) a temperature sensor (not illustrated), which detects a temperature of the impregnating liquid 20, is provided in the hollow tube 3 and (ii) data indicative of a temperature detected by the temperature sensor is transmitted to the heating mechanism 7. In a case where the heating mechanism 7 determines that a temperature detected by the temperature sensor is lower than a given temperature, the heating mechanism 7 heats the impregnating liquid 20 near the surface 21 until a temperature of the impregnating liquid 20 is at least equal to or higher than the given temperature. By thus controlling a temperature of the impregnating liquid 20 with the use of the heating mechanism 7, it is possible to suppress a decrease in temperature of the impregnating liquid 20 near the surface 21. This allows proper vacuum impregnation to be continued.

Incidentally, in a case where the impregnating liquid 20 (solvent or dispersion medium) vaporizes near the surface 21, the impregnating liquid 20 increases in concentration near the surface 21. This may cause a change in composition of the impregnating liquid 20.

In view of the circumstances, the vacuum impregnation device 1 can further include a stirring mechanism 8 which stirs (i) the impregnating liquid 20 drawn into the hollow tube 3 and (ii) the impregnating liquid 20 stored in the liquid storing tank 2. By circulating the impregnating liquid 20 in the hollow tube 3 and the liquid storing tank 2 with the use of the stirring mechanism 8, it is possible to make constant the concentration of the impregnating liquid 20 near the surface 21. This makes it possible to prevent a change in composition of the impregnating liquid 20. Furthermore, by circulating the impregnating liquid 20 in the hollow tube 3 and in the liquid storing tank 2 with the use of the stirring mechanism 8, it is possible to suppress a decrease in temperature of the impregnating liquid 20 near the surface 21.

Embodiment 2

The following description will discuss Embodiment 2. Embodiment 2 will describe a configuration for shortening time required to produce a vacuum 31.

Examples of such a configuration include a configuration in which (i) an oil-sealed rotary vacuum pump (not illustrated) is employed as the vacuum pump 5 illustrated in FIG. 1 and (ii) a booster pump (not illustrated) is connected, in series, to the oil-sealed rotary vacuum pump. This allows an increase in velocity at which gas in a hollow tube 3 is discharged. It is therefore possible to shorten the time required to produce the vacuum 31.

Other examples of the above configuration include configurations as illustrated in respective of FIGS. 2 and 3. Such configurations will be described below with reference to respective of FIGS. 2 and 3. Note that, for convenience, identical reference numerals are given to respective members having functions identical to those of the members described in Embodiment 1, and descriptions of the members will be omitted.

(a) of FIG. 2 is a cross-sectional view illustrating a configuration of a vacuum impregnation device in accordance with Embodiment 2 of the present invention. As illustrated in (a) of FIG. 2, a vacuum impregnation device 1a (impregnation device) includes a liquid storing tank 2, a hollow tube 3, an exhaust tube 4, a vacuum pump 5, a transport mechanism 6, a liquid supply pump 9, and baffle plates 10. The vacuum impregnation device 1a is different from the vacuum impregnation device 1 (see FIG. 1) in that the vacuum impregnation device 1a further includes the liquid supply pump 9 and the baffle plates 10.

As illustrated in (a) of FIG. 2, the liquid supply pump 9 is communicated with the hollow tube 3. The liquid supply pump 9 draws up an impregnating liquid 20 near a surface 22 of the impregnating liquid 20, and then supplies the impregnating liquid 20 thus updrawn to the other end side of the baffle plates 10 in the hollow tube 3. The impregnating liquid 20 supplied into the hollow tube 3 flows down, due to its self-weight, toward an opening 30 of the hollow tube 3. In other words, the liquid supply pump 9 is provided for circulating the impregnating liquid 20 from inside of the hollow tube 3 to the liquid storing tank 2 by supplying, into the hollow tube 3, the impregnating liquid 20 in the liquid storing tank 2.

The baffle plates 10 are provided in respective given positions in the hollow tube 3 (see (a) and (b) of FIG. 2). The given positions indicate any positions on an opening 30 side of a position where the liquid supply pump 9 is communicated with the hollow tube 3. (a) of FIG. 2 illustrates an example in which the baffle plates 10 are provided in respective positions lower than the surface 22. Note, however, that it is not always necessary that the baffle plates 10 be provided in such respective positions.

Each of the baffle plates 10 is a plate-shaped member provided so as to be substantially parallel to a bottom surface of the liquid storing tank 2 (that is, so as to be substantially at right angle to the a wall surface of the hollow tube 3). The baffle plates 10 separate the impregnating liquid 20 drawn into the hollow tube 3 from the impregnating liquid 20 stored in the liquid storing tank 2, and dam a flow of the impregnating liquid 20, which is drawn into the hollow tube 3, into the liquid storing tank 2. The baffle plates 10 form slits 11 through which at least the porous material 40 passes. Note that (b) of FIG. 2 is a perspective view illustrating the inside of the hollow tube 3 illustrated in (a) of FIG. 2.

Most of the impregnating liquid 20, flowing to the liquid storing tank 2 due to liquid supplying which is carried out by the liquid supply pump 9, is dammed by the baffle plates 10. Note, however, that part of the impregnating liquid 20 flows into the liquid storing tank 2 through small gaps formed by the respective slits 11 and the porous material 40. In other words, the baffle plates 10, which form the slits 11, suppress circulation of the impregnating liquid 20 which circulation is caused by the liquid supply pump 9 supplying the impregnating liquid 20. Note that a size (width) of each of the slits 11 is not particularly limited, provided that it allows the porous material 40 to pass through the each of the slits 11 and allows the circulation to be suppressed.

The vacuum 31 decreases in degree of vacuum due to pressure loss which occurs in a case where the impregnating liquid 20 passes through the slits 11 while flowing to the liquid storing tank 2 from the other end side of the hollow tube 3 by liquid supplying which is carried out by the liquid supply pump 9. This makes it possible to maintain an exhaust velocity of the vacuum pump 5 at a high velocity. It is therefore possible to shorten the time required to produce the vacuum 31.

Note that, in a case where the porous material 40 is made up of a plurality of porous materials, the slits 11 are not particularly limited, provided that (i) an endless conveyor and holding sections included in the transport mechanism 6 and (ii) the plurality of porous materials placed on the respective holding sections can pass through the slits 11. Note also that the slits 11 are formed by the baffle plates 10 but are not limited to such. Alternatively, the slits 11 can be long and thin holes formed on a single baffle plate 10.

The liquid supply pump 9 is used to shorten the time required to produce the vacuum 31. Therefore, operation of the liquid supply pump 9 (that is, liquid supplying carried out by the liquid supply pump 9) is stopped, in a case where a surface 21 of the impregnating liquid 20 reaches a height at which a degree of vacuum, which falls within a given range, is achieved. For example, the operation of the liquid supply pump 9 is stopped, in a case where a liquid surface sensor (not illustrated), provided in the hollow tube 3, determines that the surface 21 reaches this height.

(Modified Example of Vacuum Impregnation Device 1*a*)

FIG. 3 is a cross-sectional view illustrating a configuration of a vacuum impregnation device which is a modification of the vacuum impregnation device illustrated in FIG. 2. A vacuum impregnation device 1*b* (impregnation device) illustrated in FIG. 3 is different from the vacuum impregnation device 1*a* illustrated in (a) of FIG. 2 in that baffle plates are slanted with respect to an axis of a hollow tube 3. Baffle plates 10*a* illustrated in FIG. 3 include slanted plates provided in respective given positions in the hollow tube 3. The baffle plates 10*a* cause slits 11*a*, through which a porous material 40 passes, to be formed. Baffle plates 10*a* (the slanted plates), connected to the hollow tube 3, are each slantingly provided so as to become higher from the respective slits 11*a* toward the hollow tube 3 (toward a position where a liquid supply pump 9 is communicated with the hollow tube 3). A baffle plate 10*a* between the slits 11*a* is substantially parallel to a bottom surface of a liquid storing tank 2.

The baffle plates 10 are thus not limited to a configuration in which the baffle plates 10 are substantially parallel to the bottom surface of the liquid storing tank 2 as illustrated in (a) of FIG. 2. Alternatively, the baffle plates 10 can be configured such that part thereof is slant with respect to the bottom surface, like the baffle plates 10*a* illustrated in FIG. 3.

Embodiment 3

The following description will discuss Embodiment 3 of the present invention with reference to FIG. 4. FIG. 4 is a cross-sectional view illustrating a configuration of a vacuum impregnation device 1*c* in accordance with Embodiment 3 of the present invention. Embodiment 3 will describe a configuration in which sufficient impregnation is carried out with respect to pores of a porous material 40, instead of complicating the configuration. As illustrated in FIG. 4, the vacuum impregnation device 1*c* is different from the vacuum impregnation device 1 of Embodiment 1 and the vacuum impregnation devices 1*a* and 1*b* of Embodiment 2 mainly in that the vacuum impregnation device 1*c* includes a liquid storing tank 2*a* instead of the liquid storing tank 2.

Similar to the liquid storing tank 2, the liquid storing tank 2*a* is a container which has an open upper end in a vertical direction in a state where the vacuum impregnation device 1*c* is placed on a horizontal surface and which stores an impregnating liquid 20. A porous material 40 is impregnated with the impregnating liquid 20. The liquid storing tank 2*a* has a first bottom part 2*aa* and a second bottom part 2*ab*. The first bottom part 2*aa* is a bottom part on a side from which the porous material 40 enters the impregnating liquid 20. The second bottom part 2*ab* is a bottom part on a side from which the porous material 40 that has been subjected to vacuum impregnation goes out of the impregnating liquid 20.

A distance between the first bottom part 2*aa* and a surface 22 of the impregnating liquid 20 (depth on a first bottom part 2*aa* side) is identical to that of the vacuum impregnation devices 1, 1*a*, and 1*b*. Meanwhile, a distance between the second bottom part 2*ab* and the surface 22 (depth on a second bottom part 2*ab* side) is longer than that between the first bottom part 2*aa* and the surface 22. That is, the depth on the second bottom part 2*ab* side (that is, a side on which the porous material 40 that has been vacuum-deaerated in a hollow tube 3 moves from a vacuum 31 into the liquid storing tank 2*a* via an opening 30 of the hollow tube 3) is deeper than that on the first bottom part 2*aa* side.

Here, the depth on the second bottom part 2*ab* side will be described below in more detail.

In a case where each pore in the porous material 40 has a shape in which (i) an entrance of the pore, through which the pore is impregnated with the impregnating liquid 20, is narrow and (ii) a depth of the pore is deep, the impregnating liquid 20 is high in flow resistance at the entrance of the pore. Therefore, in order to fill the pore to the depth thereof with the impregnating liquid 20, it is necessary to sufficiently increase a driving force for impregnating the pore with the impregnating liquid 20. The driving force for impregnating, with the impregnating liquid 20, pores of the porous material 40 which has been vacuum-deaerated is specified by a maximum pressure Pmax of the impregnating liquid 20. The maximum pressure Pmax (maximum pressure necessary for the porous material 40 to be impregnated with the impregnating liquid 20) is a pressure which is exerted on a vacuum-deaerated porous material 40 when the vacuum-deaerated porous material 40 passes through a position which is at a maximum depth from the surface 22 of the impregnating liquid 20 in the liquid storing tank 2*a*. The maximum pressure Pmax is expressed by Expression (1).

$$P\text{max} = Pa + \rho \times g \times h\text{max} \tag{1}$$

where Pa denotes an atmospheric pressure applied to the surface 22, ρ denotes a density of the impregnating liquid 20, g denotes a gravitational acceleration, and hmax denotes a maximum depth. That is, a pressure required for the pores to be sufficiently impregnated with the impregnating liquid 20 is specified by the maximum depth hmax.

According to vacuum-impregnation, the maximum depth hmax is, in general, extremely shallow. Therefore, the maximum pressure Pmax of the impregnating liquid 20 is substantially identical to the atmospheric pressure Pa. Accordingly, in a case where impregnation with an impregnating liquid is insufficient in batch type vacuum impregnation, "vacuum pressure impregnation" is carried out. In the "vacuum pressure impregnation," insides of pores of a porous material are sufficiently impregnated with the impregnating liquid by applying a pressure to the impregnation liquid, while the porous material is being soaked in the impregnating liquid in a sealed container, so as to increase a driving force for the impregnation. Note that the pressure applied to the impregnation liquid ranges from several atmospheres to tens of atmospheres, depending on an object to be impregnated with the impregnating liquid. Therefore, in a case of the "vacuum pressure impregnation," a mechanism is required which applies, to the impregnation liquid, a pressure for increasing the driving force for the impregnation.

Therefore, according to the vacuum impregnation device 1c, the maximum depth hmax is determined, that is, a moving distance (maximum moving distance) of the porous material 40 from the surface 22 to inside (a transport mechanism 6a near the second bottom part 2ab) of the liquid storing tank 2a is determined. According to the vacuum impregnation device 1c of Embodiment 3, a depth (the maximum depth) from the surface 22, which depth is necessary for the porous material 40 to be impregnated with the impregnating liquid 20, is specified so as to satisfy Expression (2) derived from Expression (1) (see FIG. 4).

$$h\text{max}=(P\text{max}-Pa)/(\rho \times g) \quad (2)$$

That is, the depth on the second bottom part 2ab side of the liquid storing tank 2a is specified so as to satisfy Expression (2). In other words, the impregnation of the pores of the porous material 40 is carried out by specifying a distance, for which the porous material 40 that has been vacuum-deaerated moves (descends) in a direction of a gravitational force, so that the distance satisfies Expression (2).

For example, in a case where it is intended to impregnate the porous material 40 with the impregnating liquid 20 which is water whose density is 1 g/cm³ and whose maximum pressure is 4 atmospheres (nearly equal to 4×9.8 N) (here, not gauge pressure but absolute pressure), the maximum depth hmax is as follows.

$$(4 \times 9.8 \text{ N} - 1 \times 9.8 \text{ N})/(1 \text{ g/cm}^3 \times 9.8 \text{ m/s}^2) = 30\text{m}$$

That is, according to this example, the liquid storing tank 2a which has a depth equal to or more than 30 m on the second bottom part 2ab side is employed so that the maximum moving distance is 30 m.

As described above, according to Embodiment 3, it is possible to sufficiently impregnate, with the impregnating liquid 20, the pores of the porous material 40 which has been vacuum-deaerated, merely by moving porous material 40 to the second bottom part 2ab instead of carrying out the vacuum pressure impregnation. That is, it is possible to sufficiently impregnate, with a simple configuration, the pores with the impregnating liquid 20. Moreover, it is possible to cause most bubbles not to remain in the pores, as compared with the vacuum pressure impregnation.

Note that, according to the above configuration, the liquid storing tank 2a, whose depth on the second bottom part 2ab side satisfies the maximum depth hmax, is employed. That is, the liquid storing tank 2a, which has such a cross-sectional shape that the depth on the second bottom part 2ab side is deeper than that on the first bottom part 2aa side, is employed. The cross-sectional shape is a shape of a cross-section (cross-section illustrated in FIG. 4) of the liquid storing tank 2a which cross-section is obtained by cutting, in a state where the vacuum impregnation device 1c is placed on the horizontal surface, the liquid storing tank 2a at a plain surface including the direction of the gravitational force and a direction of movement of the porous material 40. Note also that the liquid storing tank 2a can be configured such that a tank which includes the transport mechanism 6a and which stores the impregnating liquid 20 is provided so as to be communicated with the liquid storing tank 2 illustrated in FIG. 1. In this case, a depth of the liquid storing tank 2 and a depth of the tank are specified so that a total of those depths satisfies the maximum depth hmax.

With such a configuration, it is possible to cause the porous material 40 which has been subjected to vacuum impregnation not to be exposed to outside of the impregnating liquid 20, for example, to the air. This allows an avoidance of a decrease in differential pressure, serving as a driving force for the impregnation, between inside and outside of the pores, the decrease being caused by the air entering part of the pores which part is not completely impregnated with the impregnating liquid 20, thereby causing a decrease in degree of vacuum of the part of the pores.

Note that Embodiment 3 is not limited to the configuration of the liquid storing tank 2a as illustrated in FIG. 4. The liquid storing tank 2a can be alternatively configured such that the tank is provided separately from the liquid storing tank 2 illustrated in FIG. 1. In this case, it is not always necessary to provide the tank, which is for the impregnation, below the hollow tube 3. The tank and the hollow tube 3 can be provided side by side. This allows suppression of a height of the entire vacuum impregnation device 1c.

[Other Configurations]

Note that an embodiment of the present invention can be also described as below.

That is, an impregnation device in accordance with an embodiment of the present invention includes: an impregnating liquid tank for storing an impregnating liquid with which a plurality of porous materials are to be impregnated; a hollow tube, having an opening at its one end, which is provided in the impregnating liquid tank so that the opening is soaked in the impregnating liquid; a depressurizing device for depressurizing inside of the hollow tube so that (i) the impregnating liquid is drawn into the other end side of the hollow tube and (ii) a vacuum, whose degree of vacuum falls within a given range, is produced on the other end side of the hollow tube, the depressurizing device being communicated with the hollow tube; and a moving mechanism for moving the plurality of porous materials in the impregnating liquid drawn into the hollow tube.

The present invention is not limited to the description of the embodiments, but may be altered by a skilled person in the art within the scope of the claims. An embodiment derived from a proper combination of technical means disclosed in different embodiments is also encompassed in the technical scope of the present invention.

[Other Configurations 2]

The foregoing impregnation method employed by the vacuum impregnation device 1 can be described as follows.

According to the vacuum impregnation device 1, a relative position of (i) a surface 22 of an impregnating liquid 20 in a liquid storing tank 2 and (ii) an opening 30 of a hollow tube 3 is first adjusted so that the opening 30 is soaked in the impregnating liquid 20 stored in the liquid storing tank 2 (adjusting step). After the adjusting step, inside of the hollow tube 3 is depressurized so that (i) the impregnating liquid 20 is drawn into the other end side of the hollow tube 3 and (ii) a vacuum 31, whose degree of vacuum falls within a given range, is produced on the other end side of the hollow tube 3 (depressurizing step). After the depressurizing step, the porous material 40 is moved in the impregnating liquid 20 drawn into the hollow tube 3 (porous material moving step). By carrying out such a simple process, it is possible to carry out vacuum impregnation with respect to the porous material 40.

Specifically, in the porous material moving step, the porous material 40 is moved, in a direction, from the opening 30 toward a surface 21 of the impregnating liquid 20 in the hollow tube 3, in order that vacuum deaeration is promoted (surface direction moving step). After the surface direction moving step, the porous material 40 is moved, in a direction, from the surface 21 toward the opening 30, in order that impregnation is further promoted (opening direction moving step).

Note that moving of the porous material 40 can be started before the vacuum 31 is produced or while the vacuum 31 is being produced. That is, the depressurizing step can be carried out after the porous material moving step. Alternatively, the depressurizing step and the porous material moving step can be both carried out in parallel. However, in these cases, the degree of vacuum of the vacuum 31 is low. This causes pores of the porous material 40 not to be sufficiently deaerated and ultimately causes a differential pressure, serving as a "driving force", to be small. Therefore the pores of the porous material 40 may not be sufficiently impregnated with the impregnating liquid 20. For this reason, the porous material moving step is preferably carried out after the depressurizing step in order that the vacuum-deaeration and the impregnation are sufficiently carried out with respect to the porous material 40.

The opening direction moving step can be such that the porous material 40 is moved from vicinity of the surface 21 of the impregnating liquid 20 in the hollow tube 3 to inside of the liquid storing tank 2 via the opening 30. In this case, a depth of the impregnating liquid 20 stored in a liquid storing tank 2a (a distance between a second bottom part 2ab of the liquid storing tank 2a and a surface 22 of the impregnating liquid 20) can be a depth specified by the foregoing Expression (2). Further, in the opening direction moving step, a maximum distance hmax between the surface 22 of the impregnating liquid 20 in the liquid storing tank 2 and the porous material 40 in the impregnating liquid 20 can be the depth specified by Expression (2). Note that, in practice, the depth of the impregnating liquid 20 stored in the liquid storing tank 2a is set to such a depth that does not prevent sufficient impregnation and smooth moving of the porous material 40. Therefore, the depth of the impregnating liquid 20 stored in the liquid storing tank 2a can be deeper than the depth specified by Expression (2). Note, however, that the porous material 40 is preferably moved near the second bottom part 2ab as much as possible.

Note that the hollow tube 3 is only necessary to be configured such that the vacuum 31 is produced in the hollow tube 3 by the method described in the foregoing embodiments. That is, the hollow tube 3 can be a container which is hollow and in which the vacuum 31 can be produced. Therefore, it is not always necessary that a shape of a cross-section of the hollow tube 3, which cross-section is in a direction perpendicular to a direction in which the hollow tube 3 extends, be circular. Alternatively, the shape of the cross-section can be, for example, elliptical or rectangular.

SUMMARY

In order to attain the above object, an impregnation device in accordance with an embodiment of the present invention includes:

an impregnating liquid tank for storing the impregnating liquid with which the porous material is to be impregnated;

a hollow tube, having an opening at its one end, which is provided in the impregnating liquid tank so that the opening is soaked in the impregnating liquid;

a depressurizing device for depressurizing inside of the hollow tube so that (i) the impregnating liquid is drawn into the other end side of the hollow tube and (ii) a vacuum, whose degree of vacuum falls within a given range, is produced on the other end side of the hollow tube, the depressurizing device being communicated with the hollow tube; and a moving mechanism for moving the porous material in the impregnating liquid drawn into the hollow tube.

According to the above configuration, the hollow tube is provided so that the opening of the hollow tube is soaked in the impregnating liquid stored in the impregnating liquid tank. The depressurizing device depressurizes the inside of the hollow tube so that (i) the impregnating liquid is drawn into the other end side of the hollow tube and (ii) the vacuum is produced on the other end side of the hollow tube. The moving mechanism moves the porous material in the impregnating liquid drawn into the hollow tube. Therefore, it is possible to vacuum-deaerate pores of the porous material and vacuum-impregnate the pores with the impregnating liquid.

The vacuum, produced with the use of the depressurizing device, has a degree of vacuum falling within the given range. That is, the degree of vacuum of the vacuum is maintained in the given range. For example, in a case where the degree of vacuum is lower than a given value, the depressurizing device is caused to operate so that the degree of vacuum is prevented from being outside the given range. It is therefore possible to suppress a decrease in degree of vacuum of the vacuum.

Therefore, according to an embodiment of the present invention, since the moving mechanism continuously moves the porous material in the impregnating liquid in the hollow tube in a state where the degree of vacuum of the vacuum is maintained in the given range, it is possible to continuously vacuum-impregnating the pores of the porous material with the impregnating liquid.

Furthermore, according the above configuration, the vacuum impregnation device does not need to provide a complicated mechanism which is necessary so as to maintain the degree of vacuum in a case where a pair of seal rollers is, for example, used. It is therefore possible to vacuum-impregnate, with a simple configuration, the porous material with the impregnating liquid.

Therefore, according to the impregnation device in accordance with an embodiment of the present invention, it is possible to continuously vacuum-impregnate, with a simple configuration, the porous material with the impregnating liquid.

The impregnation device in accordance with an embodiment of the present invention is preferably arranged such that the vacuum is produced by the depressurizing device instead of using the principle of Torricelli's vacuum.

For example, in a case where the principle of Torricelli's vacuum is used, the vacuum is produced in the hollow tube by the following procedure.

That is, after the inside of the hollow tube is caused (i) to be communicated with outside air and (ii) not to be communicated with the impregnating liquid tank by closing the opening, the inside of the hollow tube is filled with the impregnating liquid. The inside of the hollow tube is then caused not to be communicated with the outside air in a state where the inside of the hollow tube is filled with the impregnating liquid. Thereafter, the inside of the hollow tube is caused to be communicated with the impregnating liquid tank by opening the opening. This causes the impregnating liquid in the hollow tube to flow, due to its self-weight, into the impregnating liquid tank, thereby producing the vacuum on the other end side of the hollow tube.

Therefore, in a case where the vacuum is produced in the hollow tube by the above procedure, it is necessary to provide, to the impregnation device, (i) a first on-off valve which controls communication between the inside of the hollow tube and the outside air and (ii) a second on-off valve which controls communication between the inside of the hollow tube and the liquid storing tank. That is, the first on-off valve is opened and the second on-off valve is closed, before the inside of the hollow tube is filled with the impregnating liquid. On the other hand, the first on-off valve is closed and the second on-off valve is opened, after the inside of the hollow tube is filled with the impregnating liquid.

Note that such a method of producing a vacuum (negative pressure space) is known in, for example, the techniques disclosed in Patent Literatures 2 and 4.

On the other hand, according to the impregnation device in accordance with an embodiment of the present invention, the vacuum is produced on the other end side of the hollow tube by depressurizing the inside of the hollow tube with the use of the depressurizing device so that the impregnating liquid is drawn to the other end side of the hollow tube. That is, the vacuum is produced by the depressurizing device instead of using the principle of Torricelli's vacuum (that is, with the use of a method totally different from the method of producing a vacuum in which method the principle of Torricelli's vacuum is used).

Therefore, it is possible to produce the vacuum in the hollow tube without providing the first on-off valve and the second on-off valve to the impregnation device in accordance with an embodiment of the present invention. This allows a configuration of the impregnation device to be simple.

Further, the impregnation device in accordance with an embodiment of the present invention is preferably arranged such that the moving mechanism moves the porous material from vicinity of the opening of the hollow tube to vicinity of a surface of the impregnating liquid in the hollow tube, and then moves the porous material from the vicinity of the surface of the impregnating liquid in the hollow tube to the vicinity of the opening of the hollow tube. According to the above configuration, it is possible to sufficiently vacuum-deaerate the pores of the porous material while the porous material is being moved from the vicinity of the opening of the hollow tube to the vicinity of the surface of the impregnating liquid in the hollow tube. After that, since the porous material is moved from the vicinity of the surface of the impregnating liquid in the hollow tube to the vicinity of the opening, it is possible to vacuum-impregnate, with the impregnating liquid, the pores which have been sufficiently vacuum-deaerated. It is therefore possible to sufficiently vacuum-impregnate the pores of the porous material with the impregnating liquid by the moving mechanism moving the porous material like above.

Further, the impregnation device in accordance with an embodiment of the present invention is preferably arranged such that the moving mechanism moves the porous material from the vicinity of the surface of the impregnating liquid in the hollow tube to inside of the impregnating liquid tank via the opening of the hollow tube;

a depth of the impregnating liquid tank is specified so as to satisfy the following expression $$h\mathrm{max}=(P\mathrm{max}-Pa)/(\rho \times g)$$

where hmax denotes a maximum moving distance of the porous material from a surface of the impregnating liquid in the impregnating liquid tank to the inside of the impregnating liquid tank, Pmax denotes a maximum pressure necessary for the porous material to be impregnated with the impregnating liquid, Pa denotes an atmospheric pressure applied to the surface of the impregnating liquid in the impregnating liquid tank, $\rho$ denotes a density of the impregnating liquid, and g denotes gravitational acceleration.

According to the above configuration, it is possible to move the porous material in the impregnating liquid tank for the maximum moving distance. This allows the maximum pressure, necessary for the impregnation, to be applied to the pores of the porous material which has been moved for the maximum moving distance. Therefore, unlike the technique disclosed in Patent Literature 1, it is possible to sufficiently impregnate the pores of the porous material with the impregnating liquid merely by moving the porous material instead of carrying out pressure impregnation in which a pressure is applied to the pores of the porous material in order that the maximum pressure necessary for the impregnation is obtained. That is, it is possible to sufficiently impregnate, with a simple configuration, the pores with the impregnating liquid.

In order to attain the above object, an impregnation method in accordance with an embodiment of the present invention is a method of impregnating a porous material with an impregnating liquid, including the steps of:

(a) adjusting a relative position of (i) a surface of an impregnating liquid stored in an impregnating liquid tank and (ii) an opening at one end of a hollow container so that the opening of the hollow container is soaked in the impregnating liquid in the impregnating liquid tank;

(b) depressurizing inside of the hollow container after the step (a) so that (i) the impregnating liquid is drawn into the other end side of the hollow container and (ii) a vacuum, whose degree of vacuum falls within a given range, is produced on the other end side of the hollow container; and (c) moving a porous material in the impregnating liquid drawn into the hollow container in the step (b).

According to the above configuration, in the adjusting step (step (a)), the relative position of (i) the surface of the impregnating liquid stored in the impregnating liquid tank and (ii) the opening of the hollow container is adjusted so that the opening is soaked in the impregnating liquid in the impregnating liquid tank. Thereafter, in the depressurizing step (step (b)), the inside of the hollow container is depressurized so that (i) the impregnating liquid is drawn into the other end side of the hollow container and (ii) the vacuum is produced on the other end side of the hollow container. Then, in the porous material moving step (step (c)), the porous material is moved in the impregnating liquid drawn into the hollow container. Therefore, it is possible to vacuum-deaerate pores of the porous material and vacuum-impregnate the pores with the impregnating liquid.

The vacuum produced in the depressurizing step has a degree of vacuum falling within the given range. That is, the degree of vacuum of the vacuum is maintained in the given range. For example, in a case where the degree of vacuum is lower than a given value, the depressurizing step is carried out so that the degree of vacuum is prevented from being outside the given range. It is therefore possible to efficiently vacuum-impregnate the pores of the porous material with the impregnating liquid.

Therefore, according to an embodiment of the present invention, since the porous material is continuously moved in the impregnating liquid in the hollow container in the porous material moving step in a state where the degree of vacuum of the vacuum is maintained in the given range, it is possible to continuously vacuum-impregnate the pores of the porous material with the impregnating liquid.

Further, according to the above configuration, it is not necessary to carry out a complicated process which is necessary so as to maintain the degree of vacuum in a case where a pair of seal rollers is, for example, used. It is therefore possible to vacuum-impregnate, with a simple process, the porous material with the impregnating liquid.

Therefore, according to the impregnation method in accordance with an embodiment of the present invention, it is possible to continuously vacuum-impregnate, with a simple process, the porous material with the impregnating liquid.

Further, the impregnation method in accordance with an embodiment of the present invention is preferably arranged such that the step (c) includes the following steps:

(c') moving the porous material, in a direction, from the opening of the hollow container toward a surface of the impregnating liquid in the hollow container;

(c") moving the porous material, which has been moved to the surface of the impregnating liquid in the hollow container in the step (c'), in a direction, from the surface of the impregnating liquid in the hollow container toward the opening of the hollow container.

According to the above configuration, it is possible to sufficiently vacuum-deaerate the pores of the porous material while, in the surface direction moving step (step (c')), the porous material is being moved, in the direction, from the opening of the hollow container toward the surface of the impregnating liquid in the hollow container. After that, since the porous material is moved, in the direction, from the surface of the impregnating liquid in the hollow container toward the opening in the opening direction moving step (step (c")), it is possible to vacuum-impregnate, with the impregnating liquid, the pores which have been sufficiently vacuum-deaerated. It is therefore possible to sufficiently vacuum-impregnate the pores of the porous material with the impregnating liquid by moving the porous material like above in the porous material moving step.

Further, the impregnation method in accordance with an embodiment of the present invention is preferably arranged such that, in the step (c"), the porous material is moved from vicinity of the surface of the impregnating liquid in the hollow container to inside of the impregnating liquid tank via the opening of the hollow container;

a depth of the impregnating liquid stored in the impregnating liquid tank is specified so as to satisfy the following expression $(P_{max} - P_a)/(\rho \times g)$ where Pmax denotes a maximum pressure necessary for the porous material to be impregnated with the impregnating liquid, Pa denotes an atmospheric pressure applied to the surface of the impregnating liquid in the impregnating liquid tank, ρ denotes a density of the impregnating liquid, and g denotes gravitational acceleration; and a maximum distance hmax between (i) the surface of the impregnating liquid in the impregnating liquid tank and (ii) the porous material in the impregnating liquid in the impregnating liquid tank is the depth specified by the expression.

According to the above configuration, it is possible to move the porous material in the impregnating liquid tank for the maximum distance from the surface of the impregnating liquid in the impregnating liquid tank. This allows the maximum pressure, necessary for the impregnation, to be applied to the pores of the porous material which has been moved for the maximum distance. Therefore, unlike the technique disclosed in Patent Literature 1, it is possible to sufficiently impregnate the pores of the porous material with the impregnating liquid merely by moving the porous material instead of carrying out pressure impregnation in which a pressure is applied to the pores of the porous material in order that the maximum pressure necessary for the impregnation is obtained. That is, it is possible to sufficiently impregnate, with a simple configuration, the pores with the impregnating liquid.

INDUSTRIAL APPLICABILITY

The present invention can be used, for example, in a case where a fiber substrate, used to manufacture prepreg which is an in-process material of fiber reinforced plastic (FRP), is impregnated with a liquid resin or a case where a porous and permeable sheet is impregnated with a liquid, a gel, or a colloidal substance.

REFERENCE SIGNS LIST

1 Vacuum impregnation device (impregnation device)
1a Vacuum impregnation device (impregnation device)
1b Vacuum impregnation device (impregnation device)
1c Vacuum impregnation device (impregnation device)
2 Liquid storing tank (impregnating liquid tank)
2a Liquid storing tank (impregnating liquid tank)
2aa First bottom part (bottom part)
2ab Second bottom part (bottom part)
3 Hollow tube (hollow container)
4 Exhaust tube
5 Vacuum pump (depressurizing device)
6 Transport mechanism (moving mechanism)
6a Transport mechanism (moving mechanism)
7 Heating mechanism
8 Stirring mechanism
9 Liquid supply pump
10 Baffle plates
10a Baffle plates
11 Slits
11a Slits
20 Impregnating liquid
21 Surface
22 Surface
30 Opening
31 Vacuum
40 Porous material

What is claimed is:
1. An impregnation device comprising:
an impregnating liquid tank for storing an impregnating liquid with which a porous material is to be impregnated;

a hollow tube, having an opening at one end side, which is provided in the impregnating liquid tank so that the opening is submerged in the impregnating liquid;

a depressurizing device for depressurizing inside of the hollow tube so that (i) the impregnating liquid is drawn into an other end side of the hollow tube and (ii) a vacuum, having a degree of vacuum falling within a given range, is produced on the other end side of the hollow tube, the depressurizing device being communicated with the hollow tube; and a moving mechanism for moving the porous material in the impregnating liquid drawn into the hollow tube;

wherein the impregnating liquid tank has a first bottom part and a second bottom part, the first bottom part being on a side on which the porous material enters the impregnating liquid from outside of the impregnating liquid tank, the second bottom part being on a side on which the porous material that has been subjected to vacuum impregnation goes out of the impregnating liquid to the outside of the impregnating liquid tank; and wherein the first bottom part has a depth different from a depth of the second bottom part.

2. The impregnation device as set forth in claim 1, wherein:

the vacuum is produced by the depressurizing device instead of using a principle of Torricelli's vacuum.

3. The impregnation device as set forth in claim 1, wherein:

the moving mechanism moves the porous material from a vicinity of the opening of the hollow tube to a vicinity of a surface of the impregnating liquid in the hollow tube, and then moves the porous material from the vicinity of the surface of the impregnating liquid in the hollow tube to the vicinity of the opening of the hollow tube.

4. The impregnation device as set forth in claim 3, wherein:

the moving mechanism moves the porous material from the vicinity of the surface of the impregnating liquid in the hollow tube to inside of the impregnating liquid tank via the opening of the hollow tube;

a depth of the impregnating liquid stored in the impregnating liquid tank is specified so as to satisfy the following expression $$h\text{max} = (P\text{max} - Pa)/(\rho \times g)$$

where hmax denotes a maximum moving distance of the porous material from the surface of the impregnating liquid in the impregnating liquid tank to the moving mechanism which is provided near the second bottom part, Pmax denotes a maximum pressure necessary for the porous material to be impregnated with the impregnating liquid, Pa denotes an atmospheric pressure applied to the surface of the impregnating liquid in the impregnating liquid tank, p denotes a density of the impregnating liquid, and g denotes gravitational acceleration; and the depth of the second bottom part of the impregnating liquid tank is deeper than the depth of the first bottom part of the impregnating liquid tank.

5. The impregnation device as set forth in claim 1, further comprising:

a liquid supply pump communicated with the hollow tube, the liquid supply pump drawing up the impregnating liquid in the impregnating liquid tank and supplying the impregnating liquid into the hollow tube; and a baffle plate for damming a flow of the impregnating liquid, which is drawn into the hollow tube by the liquid supply pump, into the impregnating liquid tank.

* * * * *